(12) United States Patent
Cho et al.

(10) Patent No.: US 12,120,509 B2
(45) Date of Patent: Oct. 15, 2024

(54) ELECTRONIC DEVICE FOR MANAGING DATA IN BLUETOOTH LOW ENERGY (BLE) COMMUNICATION AND METHOD FOR CONTROLLING THE SAME

(71) Applicant: SAMSUNG ELECTRONICS CO., LTD., Suwon-si (KR)

(72) Inventors: Daesung Cho, Suwon-si (KR); Hyeeun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 210 days.

(21) Appl. No.: 17/713,473

(22) Filed: Apr. 5, 2022

(65) Prior Publication Data

US 2022/0394466 A1    Dec. 8, 2022

Related U.S. Application Data

(63) Continuation of application No. PCT/KR2022/003541, filed on Mar. 14, 2022.

(30) Foreign Application Priority Data

Jun. 1, 2021    (KR) .................. 10-2021-0070859

(51) Int. Cl.
*H04W 12/06* (2021.01)
*G06F 21/44* (2013.01)
(Continued)

(52) U.S. Cl.
CPC ............ *H04W 12/06* (2013.01); *G06F 21/44* (2013.01); *G06F 21/6218* (2013.01); *H04W 12/50* (2021.01); *G06F 2221/2141* (2013.01)

(58) Field of Classification Search
None
See application file for complete search history.

(56) References Cited

U.S. PATENT DOCUMENTS 9,338,638 B1 *   5/2016   Palin .................. H04W 12/37
9,980,140 B1 *   5/2018   Spencer ............... H04W 12/02
(Continued)

FOREIGN PATENT DOCUMENTS

JP    2007-068035       3/2007
KR    10-2002-0026286   4/2002
(Continued)

OTHER PUBLICATIONS

Search Report and Written Opinion issued Jun. 23, 2022 in counterpart International Patent Application No. PCT/KR2022/003541.
(Continued)

*Primary Examiner* — Jeffrey R Swearingen
(74) *Attorney, Agent, or Firm* — Nixon & Vanderhye, P.C.

(57) ABSTRACT

According to an embodiment, an electronic device may include: a communication module comprising communication circuitry configured to operate in Bluetooth low energy (BLE), a memory, and at least one processor operatively coupled to the communication module and the memory. The at least one processor may be configured to: receive authentication information about each function from an external electronic device via BLE, the authentication information about each function including information about data for the function and information about an access right level of the function, store the received authentication information about each function in the memory, and control the communication module to transmit an authentication index of each function corresponding to the authentication information about the function to the external electronic device by BLE.

20 Claims, 14 Drawing Sheets

(51) Int. Cl.
*G06F 21/62* (2013.01)
*H04W 12/50* (2021.01)

(56) References Cited

U.S. PATENT DOCUMENTS

| | | |
|---|---|---|
| 2006/0143466 A1 | 6/2006 | Muller et al. |
| 2016/0148011 A1 | 5/2016 | Lee et al. |
| 2017/0041296 A1* | 2/2017 | Ford .................. G06F 21/64 |
| 2017/0171755 A1 | 6/2017 | Grange et al. |
| 2017/0220745 A1 | 8/2017 | Lee et al. |
| 2017/0230378 A1 | 8/2017 | Bliss |
| 2018/0027412 A1* | 1/2018 | Mandapaka .......... H04W 12/33 713/151 |
| 2018/0191734 A1 | 7/2018 | Yoo |
| 2019/0036688 A1* | 1/2019 | Wasily .................. H04L 9/3231 |
| 2020/0281467 A1* | 9/2020 | Biederman ............ H01Q 11/08 |
| 2020/0288269 A1 | 9/2020 | Bartucci et al. |
| 2023/0064667 A1* | 3/2023 | Eichert ................. H04W 12/08 |

FOREIGN PATENT DOCUMENTS

| | | |
|---|---|---|
| KR | 10-2006-0124049 | 12/2006 |
| KR | 10-2007-0010536 | 1/2007 |
| KR | 10-2009-0047273 | 5/2009 |
| KR | 10-2014-0089321 | 7/2014 |
| KR | 10-2015-0075589 | 7/2015 |
| KR | 10-2015-0136791 | 12/2015 |
| KR | 10-1575781 | 12/2015 |
| KR | 10-2016-0063018 | 6/2016 |
| KR | 10-2017-0091395 | 8/2017 |
| KR | 10-1773173 | 8/2017 |
| KR | 10-2020-0055293 | 5/2020 |

OTHER PUBLICATIONS

Extended European Search Report dated Jul. 16, 2024 in European Patent Application No. 22816267.3.

* cited by examiner

ELECTRONIC DEVICE FOR MANAGING DATA IN BLUETOOTH LOW ENERGY (BLE) COMMUNICATION AND METHOD FOR CONTROLLING THE SAME

CROSS-REFERENCE TO RELATED APPLICATIONS

This application is a continuation of International Application No. PCT/KR2022/003541 designating the United States, filed on Mar. 14, 2022, in the Korean Intellectual Property Receiving Office and claiming priority to Korean Patent Application No. 10-2021-0070859, filed on Jun. 1, 2021, in the Korean Intellectual Property Office, the disclosures of which are incorporated by reference herein in their entireties.

BACKGROUND

Field

Embodiments of the disclosure relate to an electronic device for managing data in Bluetooth low energy (BLE) communication and a method for controlling the same.

Description of Related Art

Bluetooth low energy (BLE) is a Bluetooth technology of transmitting and receiving low-power, low-capacity data in the 2.4-GHz frequency band within a coverage radius of about 10 m. Because a BLE device stays in sleep mode for the most time, BLE offers the benefit of very low power consumption.

For example, the BLE device has very high power efficiency at an average transmission speed equal to or less than 10 kbps, which leads to a lifetime of one year or more without battery replacement. Accordingly, BLE may be a communication scheme suitable for ultra-small Internet of things (IoT) with limited power supply, such as watches, toys, beacons, and wearable computers (wearable devices).

When devices interwork with each other based on BLE, device-to-device authentication is performed by Bluetooth pairing, and then a secure connection is established to enable encrypted transmission between the connected devices.

Conventionally, once devices are paired with each other based on BLE, authentication and communication security are guaranteed between the paired devices. Further, along with data standardization, interoperability is ensured for transmission of personal data (e.g., body data and health data). However, management of right to access to each data is not included in a standard BLE generic attribute profile (GATT)-based method.

Accordingly, when personal data is linked to an external device based on BLE, the personal data may be accessed by other functions in the external device against a user's intention, resulting in personal data leakage, because only a connection between the devices is guaranteed.

When personal health data is linked to the external device based on BLE, there may be a risk of allowing access to the personal health data for a specific application or service of the paired device, against the user's intention because only the connection between the devices is guaranteed. Therefore, the personal health data may be leaked.

SUMMARY

Embodiments of the disclosure may provide an electronic device for managing personal data by assigning data access right on a per-function basis of an external electronic device in BLE communication, and a method of controlling the electronic device.

According to various example embodiments, an electronic device may include: a communication module comprising communication circuitry configured to operate in Bluetooth low energy (BLE), a memory, and at least one processor operatively coupled to the communication module and the memory. The at least one processor may be configured to: receive authentication information about each function from an external electronic device via BLE, the authentication information about each function including information about data for the function and information about an access right level of the function, store the received authentication information about each function in the memory, and control the communication module to transmit an authentication index of each function corresponding to the authentication information about the function to the external electronic device by BLE.

According to various example embodiments, a method of controlling an electronic device may include: receiving authentication information about each function from an external electronic device through a communication module operating in BLE, the authentication information about each function including information about data for the function and information about an access right level of the function, storing the received authentication information about each function in a memory, and transmitting an authentication index of each function corresponding to the authentication information about the function to the external electronic device by BLE.

According to various example embodiments, an electronic device may include: a communication module comprising communication circuitry configured to operate in BLE, a memory, and at least one processor operatively coupled to the communication module and the memory. The at least one processor may be configured to: control the communication module to transmit authentication information about each function stored in the memory to an external wearable device by BLE, the authentication information about each function including information about data for the function and information about an access right level of the function, control the communication module to receive an authentication index of each function corresponding to the authentication information about the function from the external wearable device by BLE, and store the received authentication index of each function in the memory.

It will be appreciated by persons skilled in the art that various aspects that can be achieved with the disclosure are not limited to what has been particularly described hereinabove and other aspects of the disclosure will be more clearly understood from the following detailed description taken in conjunction with the accompanying drawings.

When an electronic device according to various example embodiments of the disclosure shares data based on Bluetooth low energy (BLE), the electronic device may manage right to access personal data in compliance to generic attribute profile (GATT)-based interoperability.

Further, according to various example embodiments of the disclosure, when BLE pairing is completed, data access right is assigned on a function basis of an external electronic device, compared to an existing method in which all services of the external electronic device may access data of the electronic device. Therefore, the risk of data leakage may be reduced.

Further, according to various example embodiments of the disclosure, even when the electronic device maintains a BLE connection with the external electronic device after a function authorized to access data by a user of the electronic device is terminated, user-unauthorized data access may be blocked.

It will be understood that various effects directly or indirectly identified through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
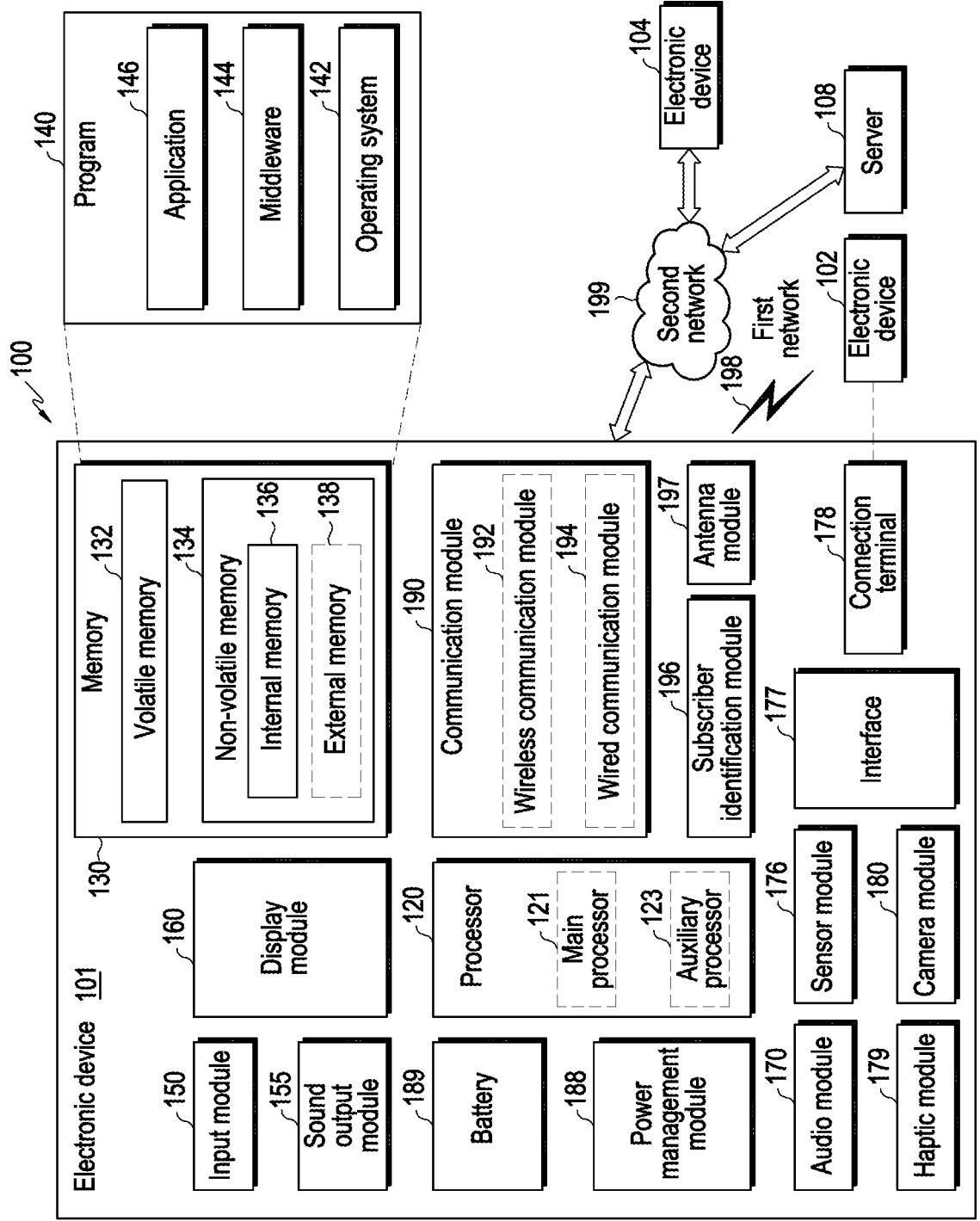
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
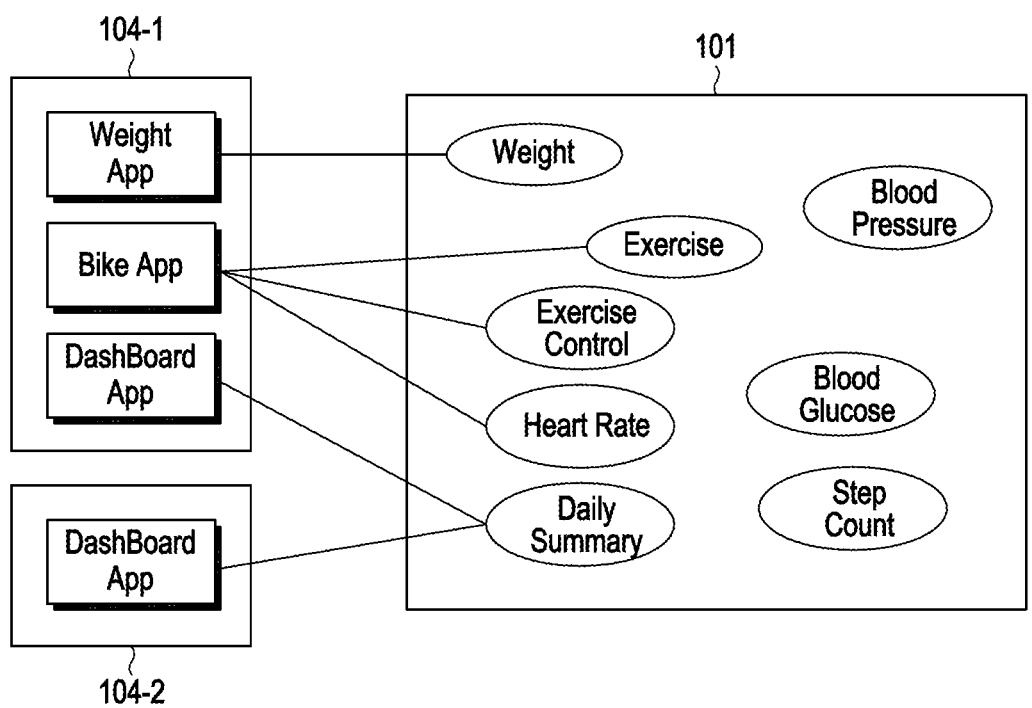
FIG. 2 is a diagram illustrating example accessible data for each function according to various embodiments.

FIG. 2 is a diagram illustrating example accessible data for each function according to various embodiments.

According to various embodiments, referring to FIG. 2, the electronic device 101 (e.g., the electronic device 101 of FIG. 1) may communicate with at least one external electronic device 104-1 and 104-2 (e.g., the electronic device 104 of FIG. 1). For example, the electronic device 101 may communicate with the at least one external electronic device 104-1 and 104-2 by Bluetooth low energy (BLE).

According to various embodiments, the electronic device 101 may, for example, be a wearable device or a mobile terminal (e.g., a smartphone). In an embodiment, the at least one external electronic device 104-1 and 104-2 may, for example, and without limitation, be a mobile terminal (e.g., a smartphone) or a smart TV.

According to various embodiments, the electronic device 101 may store a plurality of data. According to various embodiments, the plurality of data may include data related to a user's body or health (e.g., weight, blood pressure, blood glucose, heart rate, exercise amount, exercise control, step count, and so on). According to various embodiments, at least some of the plurality of data may be obtained through at least one sensor (e.g., the sensor module 176 of FIG. 1) included in the electronic device 101.

According to various embodiments, each of the at least one external electronic device 104-1 and 104-2 may include at least one function (e.g., an application or a service). For example, a first external electronic device 104-1 may include a weight application, a bike application, or a dashboard application. In an embodiment, a second external electronic device 104-2 may include a dashboard application.

According to various embodiments, at least one function included in the first external electronic device 104-1 or the second external electronic device 104-2 may use at least one of the plurality of data stored in the electronic device 101. According to various embodiments, the at least one function included in the first external electronic device 104-1 or the second external electronic device 104-2 may obtain a right to access at least one of the plurality of data stored in the electronic device 101 and use the at least one data that the at least one function is authorized to access.

For example, the weight application of the first external electronic device 104-1 may obtain right to access weight data stored in the electronic device 101 and use the weight data. The bike application may obtain right to access exercise amount data and heart rate data stored in the device 101 and use the exercise amount data and the heart rate data, or may obtain right to control an exercise in a wearable device to control the exercise in the wearable device. In an embodiment, the dashboard application included in each of the first external electronic device 104-1 and the second external electronic device 104-2 may obtain right to access daily summary data and use the daily summary data.

According to various embodiments, to access data in the electronic device 101, each of the dashboard application of the first external electronic device 104-1 and the dashboard application of the second external electronic device 104-2 may obtain right to access the data of the electronic device 101.

As such, once BLE pairing between electronic devices is completed, right to access data is assigned on a per-function basis of an external electronic device, compared to the prior art in which data of an electronic device is accessible to all services of an external electronic device. Therefore, the risk of data leakage may be reduced.

A method of operating the electronic device 101 according to various embodiments will be described in greater detail below. According to various embodiments, operations performed by the electronic device 101 to be described below may be performed by a processor (e.g., the processor 120 of FIG. 1) including at least one processing circuitry of the electronic device 101. According to an embodiment, the operations of the electronic device 101 may be performed by instructions which are stored in the memory 130 and, when executed, cause the processor 120 to operate.

Figure 3:
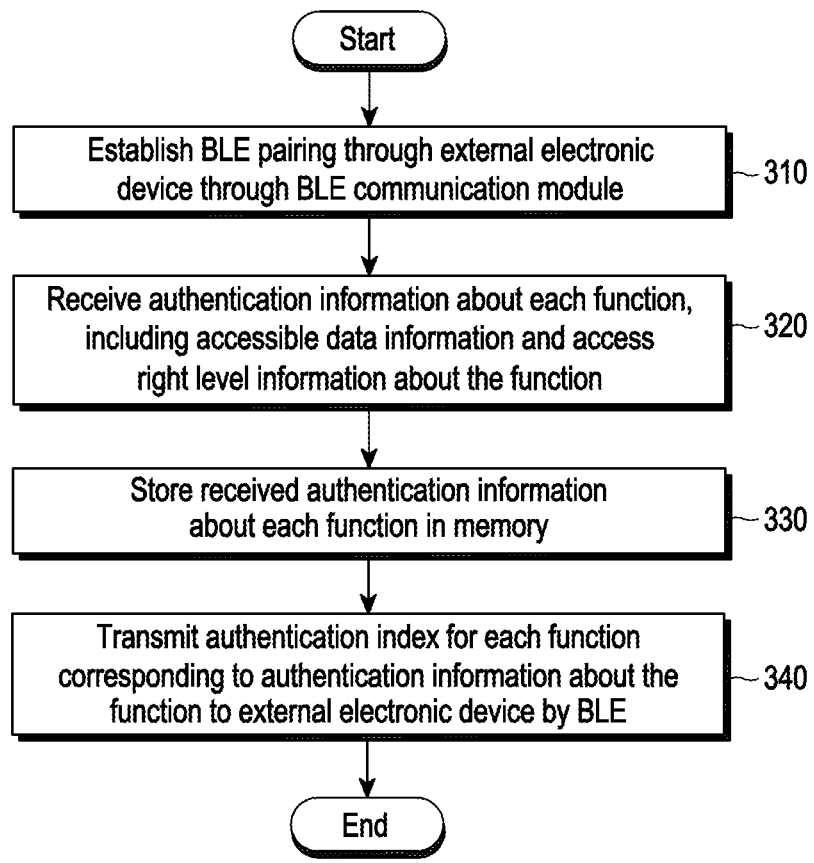
FIG. 3 is a flowchart illustrating an example operation of registering authentication information for each function of an external electronic device by an electronic device according to various embodiments.

FIG. 3 is a flowchart illustrating an example operation of registering authentication information on a per-function basis of an external electronic device in an electronic device according to various embodiments.

According to various embodiments, referring to FIG. 3, the electronic device (e.g., the electronic device 101 of FIG. 1 or the electronic device 101 of FIG. 2) may establish BLE pairing with the external electronic device (e.g., the electronic device 104 of FIG. 1 or the external electronic device 104-1 or 104-2 of FIG. 2) through a BLE communication module (e.g., the communication module 190 of FIG. 1) in operation 310. For example, the electronic device and the external electronic device may mutually perform device registration for a BLE communication connection. According to various embodiments, while the electronic device and the external electronic device are shown in FIG. 3 as establishing BLE pairing, the electronic device and the external electronic device may perform operations 320, 330, and 340 in a non-BLE pairing-based manner in real implementation.

According to various embodiments, in operation 320, the electronic device may receive authentication information about each function, including accessible data information and access right level information about the function from the external electronic device by BLE. For example, a function may include an application or service of the external electronic device.

According to various embodiments, the accessible data information about each function of the external electronic device may include information about a data type (e.g., weight, blood pressure, heart rate, blood glucose, exercise control, and so on) used for the function. According to various embodiments, the access right level information may include information about a use right level for data. For example, the access right level information may include information about at least one of read right or write right for the data.

According to various embodiments, the authentication information for each function may further include information about an authentication password. For example, the authentication password may be input through the external electronic device and used for authenticating access right, when data access is requested for the function after the access right registration.

According to various embodiments, in operation 330, the electronic device may store the received authentication information about each function in a memory (e.g., the memory 130 of FIG. 1). According to various embodiments, the electronic device may store (e.g., register) the authentication information as illustrated, for example, in [Table 1] below in the memory.

TABLE 1

| Device Name | App Name | Authentication Index | Authentication Password | Data Access Right |
|---|---|---|---|---|
| External Electronic Device 1 (BLE Address 1) | Weight App | 1 | 1234 | Weight (READ) App |
| | Bike App | 2 | 5678 | Exercise (READ) Exercise Control (READ, WRITE) Heart Rate (READ) |
| | Dashboard App | 3 | 7890 | Daily Summary (READ) |
| External Electronic Device 2 (BLE Address 2) | Dashboard App | 4 | 7794 | Daily Summary (READ) |

According to various embodiments, it may be noted from [Table 1] that external electronic device 1 (e.g., the first external electronic device 104-1 of FIG. 2) and external electronic device 2 (e.g., the second external electronic device of FIG. 2) include different applications, and a different authentication index, authentication password, data type, and/or data access right is assigned to each of the applications.

According to various embodiments, although the dashboard application is included in both of external electronic device 1 and the external electronic device 2, the electronic device may manage the data access right of each dashboard application through a different authentication index and a different authentication password.

According to various embodiments, returning to FIG. 3, in operation 340, the electronic device may transmit an authentication index for each function corresponding to the authentication information about the function to the external electronic device by BLE. For example, the electronic device may transmit an authentication index corresponding to authentication information received from the external electronic device. Accordingly, after registration of the authentication information, the electronic device may manage data access right using an authentication index, when data access is requested for a function by the external electronic device.

Figure 4:
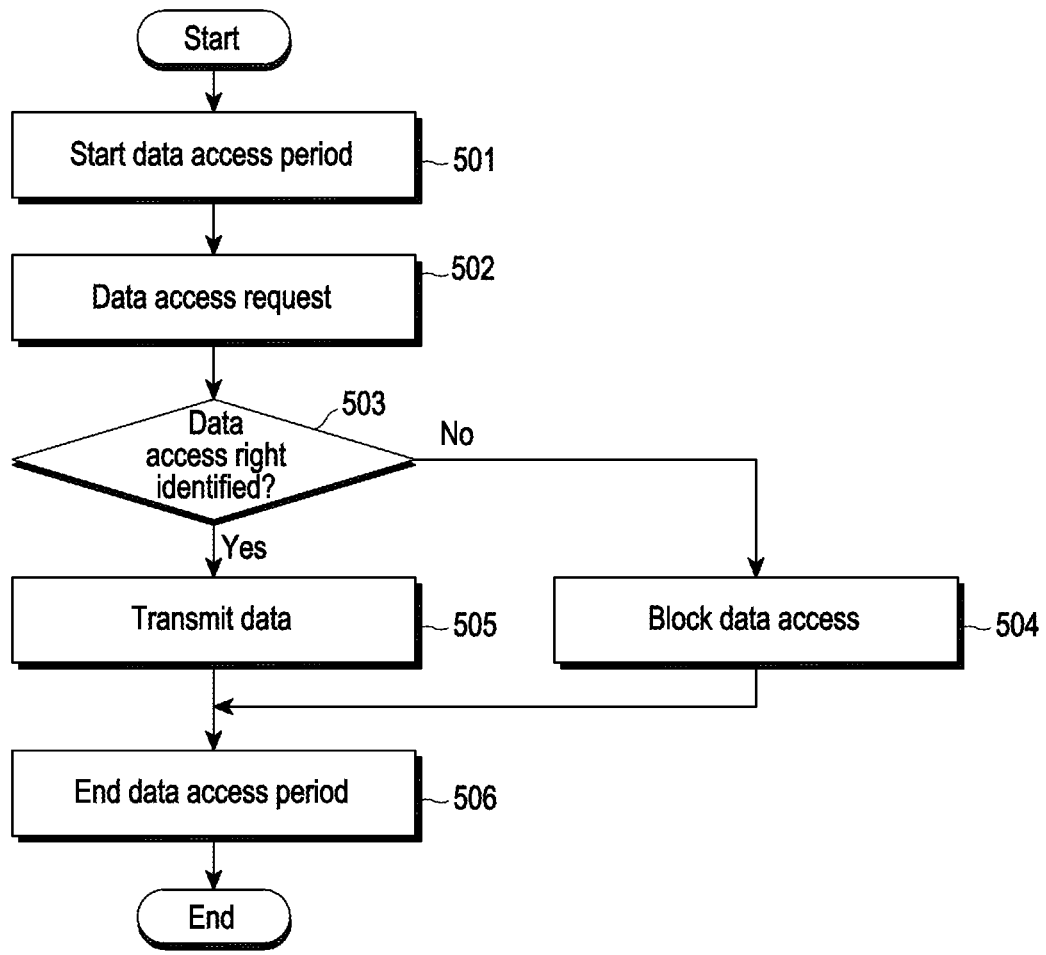
FIG. 4 is a flowchart illustrating an example operation of, upon receipt of a data access right request, determining whether to accept the data access in an electronic device according to various embodiments.

FIG. 4 is a flowchart illustrating an example operation of, upon receipt of a data access right request, determining whether to accept the data access in an electronic device according to various embodiments. According to various embodiments, referring to FIG. 4, the electronic device (e.g., the electronic device 101 of FIG. 1 or the electronic device 101 of FIG. 2) may start a data access period in operation 501. For example, when the electronic device receives a start command for the data access period from an external electronic device (e.g., the electronic device 104 of FIG. 1 or the external electronic device 104-1 or 104-2 of FIG. 2), the electronic device may start the data access period. For example, as defined in [Table 8] to be described in greater detail below, the external electronic device may transmit an operation code, for example, 0×06 defining start for data access and authentication information including an authentication index and authentication consent (e.g., an authentication password) as the start command for the data access period to the electronic device.

According to various embodiments, in operation 502, the electronic device may receive a data access request. For example, the electronic device may receive a data access request for a first function from the external electronic device.

According to various embodiments, in operation 503, the electronic device may identify data access right. For example, upon receipt of the data access request for the first function from the external electronic device, the electronic device may determine whether to accept the data access request based on the authentication index of the first function, included in the data access request.

For example, the electronic device may determine whether to allow access to data corresponding to the authentication index based on the authentication index and the authentication password received from the external electronic device.

According to an embodiment, upon receipt of the data access request for the first function from the external electronic device, the electronic device may request user confirmation. For example, the electronic device may display a message asking the user whether to accept the data access request on a display (e.g., the display module 160 of FIG. 1) based on the authentication index of the first function in response to the data access request. For example, the message asking the user whether to access the data access request may include a user ID and/or password input request or a biometric authentication request (e.g., a request for fingerprint or iris authentication). According to various embodiments, the electronic device may determine whether to accept the data access request for the first function based on a user acceptance or rejection received in response to the message.

According to various embodiments, when no data access right is identified for the data access request (operation 503—No), the electronic device may block data access in operation 504.

According to various embodiments, upon receipt of a data access request for a second function different from the first function from the external electronic device within the data access period, the electronic device may block data access in response to the data access request for the second function, based on the authentication index of the second function.

In an embodiment, when an authentication password received from the external electronic device does not match the authentication index of the first function or the user does not allow data access through a message, the electronic device may block data access in response to the data access request.

According to various embodiments, when data access right is identified for the data access request (operation 503—Yes), the electronic device may transmit data to the external electronic device in operation 505. For example, when the data access request for the first function received from the external electronic device is determined to be authorized for data access, the electronic device may accept the data access request and transmit data for the first function to the external device through a communication module.

According to various embodiments, the electronic device may further transmit a result of the determination as to whether to accept the data access request to the external electronic device. For example, the electronic device may transmit a result indicating whether data access is allowed or blocked in response to the data access request to the external electronic device.

According to various embodiments, in operation 506, the electronic device may end the data access period. For example, the electronic device may end the data access period after transmitting the result of the data access request for the first function and transmitting data or blocking data access. For example, upon receipt of an end command for the data access period from the external electronic device, the electronic device may end the data access period. For example, as defined in [Table 8] to be described in greater detail below, the external electronic device may transmit an operation code, for example, 0×07 defining stop for data access and the authentication information including the authentication index and the authentication password as the end command for the data access period to the external electronic device.

According to various embodiments, the electronic device may block data access in response to a data access request received from the external electronic device after the end of the data access period.

As described above, even when the electronic device maintains a BLE connection with the external electronic device after a function authorized to access data by the user of the electronic device is terminated through the start or end operation of a data access period, the electronic device may block user-unauthorized data access.

Figure 5:
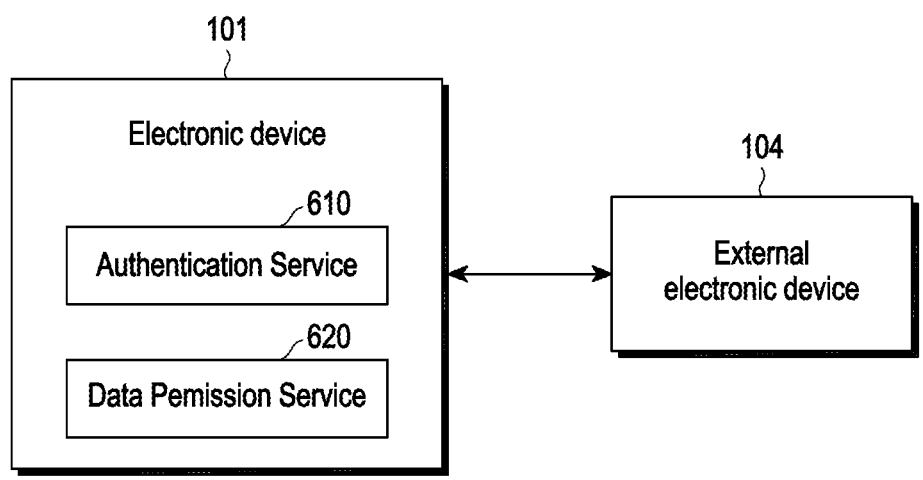
FIG. 5 is a diagram illustrating an example relationship between an electronic device and an external electronic device according to various embodiments.

FIG. 5 is a diagram illustrating an example relationship between an electronic device and an external electronic device according to various embodiments.

According to various embodiments, referring to FIG. 5, the electronic device 101 (e.g., the electronic device 101 of FIG. 1 or the electronic device 101 of FIG. 2) may conduct BLE communication with the external electronic device 104 (e.g., the electronic device 104 of FIG. 1 or the external electronic device 104-1 or 104-2 of FIG. 2). For example, the electronic device 101 may provide a service (e.g., data provision), playing a peripheral role in the BLE communication process. In another example, the external electronic device 104 may use the service, playing a central role.

According to various embodiments, the service provided by the electronic device 101 may include, for example, an authentication service 610 that provides a function of registering and deleting authentication information for management of data access right, and a data permission service 620 for managing data right.

For example, the characteristics of the authentication service 610 and the data permission service 620 for managing data right may be configured as illustrated, for example, in [Table 2] below.

TABLE 2

| Service | Characteristic | Descriptor | Property |
|---|---|---|---|
| Authentication Service | Authentication Control Point | Client Characteristic Configuration | Write, Indicate |
| Data Permission Service | Managed Data Info | | Notify |
| | Data Permission Info | | Notify |
| | Data Permission Control Point | | Write, Indicate |

According to various embodiments, an authentication control point may require authentication consent to register authentication information. For example, the authentication consent may include an authentication password input from the external electronic device 104.

According to various embodiments, the authentication service 610 of the electronic device 101 may obtain a unique authentication index of the external electronic device 104 for managing authentication registration information in response. According to various embodiments, the electronic device 101 may use the authentication index and the authentication consent, when authenticating the data request (or access) right of the external electronic device 104.

According to various embodiments, an authentication control point characteristic may include fields or codes as illustrated in [Table 3], [Table 4], [Table 5] and [Table 6].

TABLE 3

| Authentication control point characteristic fields | | |
|---|---|---|
| Field Names | Op Code | Operand |

TABLE 4

| Request Op Codes | | |
|---|---|---|
| Op Code Key | Definition | Operand |
| 0 | Reserved for future use | |
| 1 | Register Authentication Info | Authentication Consent |
| 2 | Unregister Authentication Info | Authentication Index, Authentication Consent |
| 3 | Set Name | Authentication Index, Authentication Consent, Name |
| 4-9 | Reserved for future use | N/A |

TABLE 5

| Response Op Code | | |
|---|---|---|
| Op Code Key | Definition | Operand |
| 10 | Response Code | Request Op Code, Response Code Values |
| 11-255 | Reserved for future use | |

TABLE 6

| Response Code Values] | | | |
|---|---|---|---|
| Key | Definition | Request Op Code | Response Parameter |
| 0 | | Reserved for future use | |
| 1 | Success | Register Authentication Info | Authentication Index |
| | | Unregister Authentication Info | None |
| | | Set Name | None |
| 2-N | Error Codes | All Request Op Codes | None |
| N-255 | | Reserved for future use | |

According to various embodiments, the data permission service 620 of the electronic device 101 may determine whether to allow data access by identifying an authentication password mapped to a pre-registered authentication index.

According to various embodiments, referring to [Table 2], the characteristic of the data permission service 620 may include data permission info, managed data info, and data permission control point.

According to various embodiments, the data admission control point may provide commands for inquiry about overall characteristics, inquiry data right and, request, change or deletion of data right, need right. In addition, the data access control point may provide a command for managing a data access permission period. According to various embodiments, the electronic device 101 may perform an operation of identifying a pre-registered authentication index and a mapped authentication password in order to transmit a corresponding request to change or delete data right or manage a data access permission period.

According to various embodiments, the data permission control point characteristic may include fields or codes as illustrated, for example, in [Table 7], [Table 8], [Table 9], [Table 10], [Table 11] and [Table 12].

TABLE 7

| data permission control point characteristic fields | | |
|---|---|---|
| Field Names | Op Code | Operand |

TABLE 8

| Request Op Codes | | |
|---|---|---|
| Op Code Key | Definition | Operand |
| 0 | Reserved for future use | |
| 1 | Get All Data Info List | Authentication Index, Authentication Consent |
| 2 | Get Permission | Authentication Index, Authentication Consent |
| 3 | Request Data Permission | Authentication Index, Authentication Consent, Count of Data Permission Info, List Of Data Permission Info |
| 4 | Update Data Permission | Authentication Index, Authentication Consent, Count of Data Permission Info, List Of Data Permission Info |
| 5 | Delete Data Permission | Authentication Index, Authentication Consent |
| 6 | Start For Data Access | Authentication Index, Authentication Consent |

TABLE 8-continued

Request Op Codes

| Op Code Key | Definition | Operand |
|---|---|---|
| 7 | Stop For Data Access | Authentication Index, Authentication Consent |
| 8 = 9 | | Reserved for future use |

TABLE 9

Response Op Code

| Op Code Key | Definition | Operand |
|---|---|---|
| 10 | Response Code | Request Op Code, Response Code Values |
| 11-255 | | Reserved for future use |

TABLE 10

Response Code Values

| Key | Definition | Request Op Code | Response Parameter |
|---|---|---|---|
| 0 | | Reserved for future use | |
| 1 | Success | Get All Data Info List | None (Managed Data Info will be sent using Notification.) |
| | | Get Permission | None (Data Permission Info will be sent using Notification) |
| | | Request Data Permission | None |
| | | Update Data Permission | None |
| | | Delete Data Permission | None |
| | | Start For Data Access | None |
| | | Stop For Data Access | None |
| 2-N | Error Codes | All Request Op Codes | None |
| N-255 | | Reserved for future use | |

TABLE 11

Managed data info characteristic

Managed Data Info Characteristic

UUID
Data Index

TABLE 12

Data permission info characteristic

Data Permission Info Characteristic

Data Index
Access Property
(READ | WRITE)

Figure 6A:
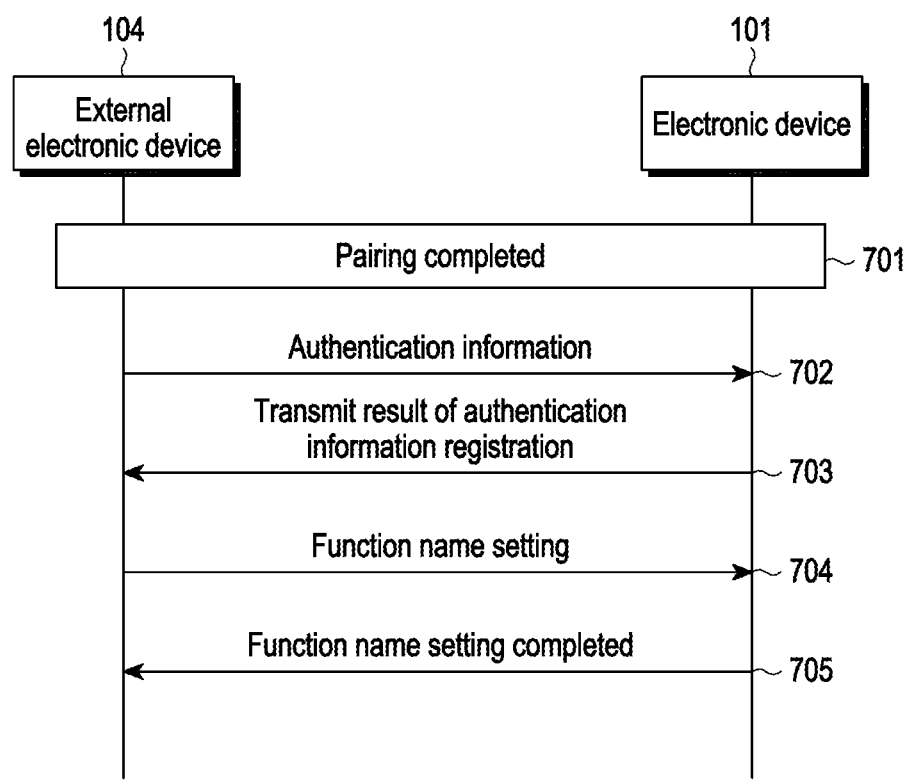
FIG. 6A is a signal flow diagram illustrating an example operation of registering authentication information in an electronic device according to various embodiments.
Figure 6B:
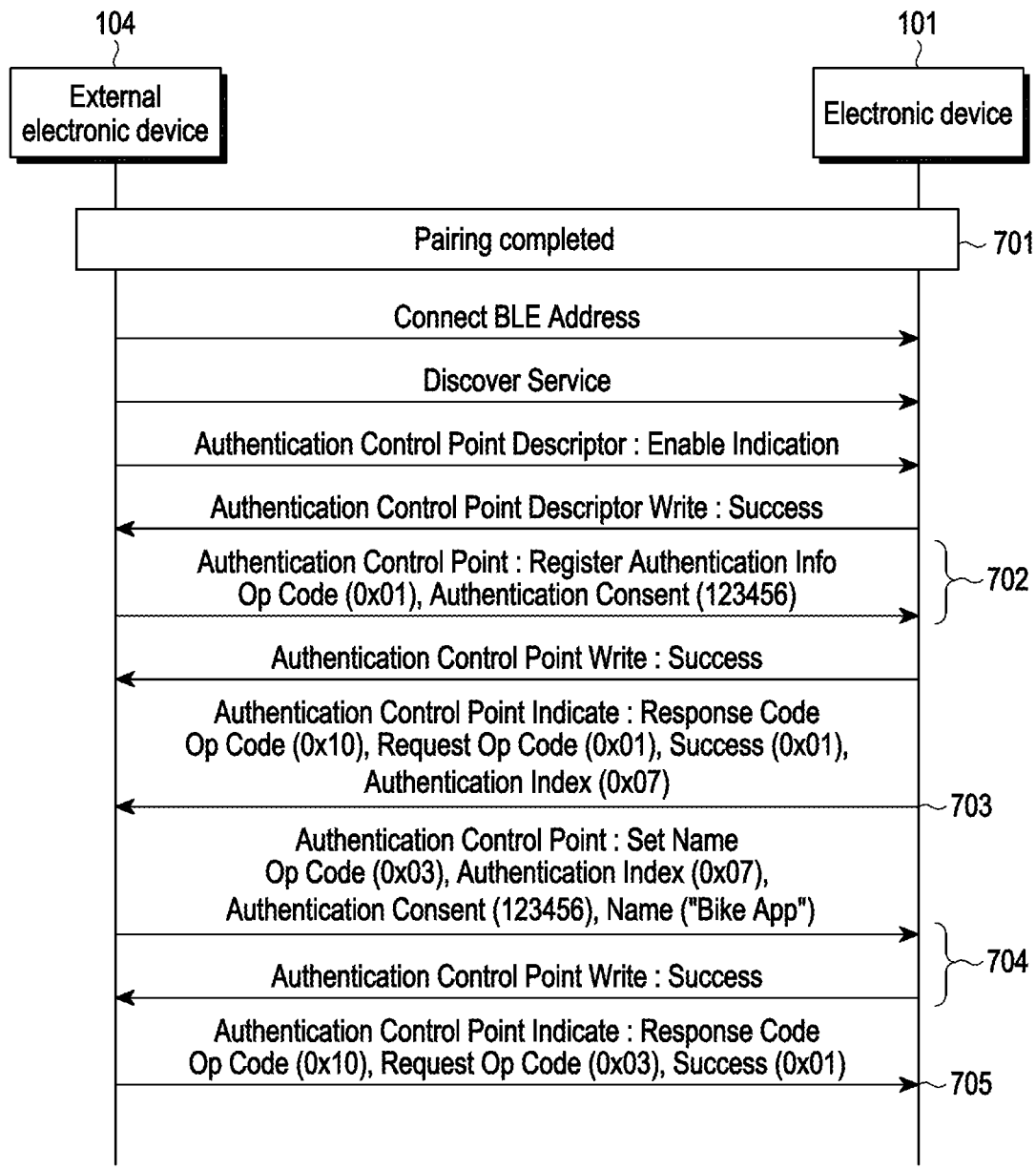
FIG. 6B is a signal flow diagram illustrating an example operation of registering authentication information in an electronic device according to various embodiments.

FIGS. 6A and 6B are signal flow diagrams illustrating an example operation of registering authentication information in an electronic device according to various embodiments.

According to various embodiments, referring to FIG. 6A or 6B, the electronic device 101 (e.g., the electronic device 101 of FIG. 1 or the electronic device 101 of FIG. 2) may complete pairing (e.g., BLE pairing) with the external electronic device 104 (e.g., the electronic device 104 of FIG. 1 or the external electronic device 104-1 or 104-2 of FIG. 2) in operation 701.

While the electronic device 101 and the external electronic device 104 are shown in FIGS. 6A and 6B as operating in the paired state, the electronic device 101 and the external electronic device 104 may also operate in a non-paired state according to various embodiments.

According to various embodiments, in operation 702, the external electronic device 104 may transmit authentication information to the electronic device 101. For example, referring to FIG. 6B, the external electronic device 104 may transmit authentication information including an operation code 0x01 defining register authentication info and an authentication consent (e.g., an authentication password (e.g., 123456)) defined in [Table 4] to the electronic device 101 in operation 702.

Figure 6C:
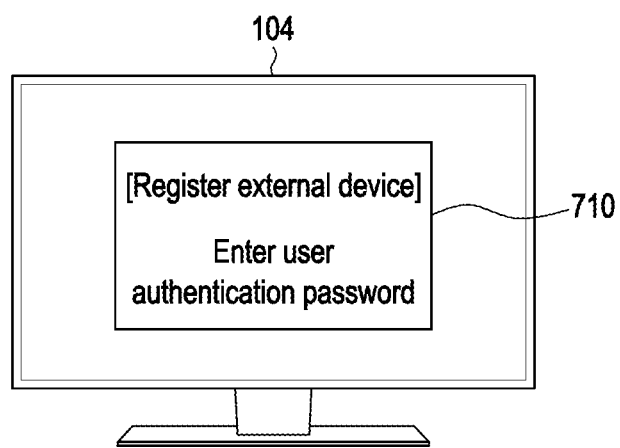
FIG. 6C is a diagram illustrating an example user interface displayed during an operation of registering authentication information of an external electronic device according to various embodiments.

According to various embodiments, the authentication password may be input through a user interface of the external electronic device 104 as illustrated in FIG. 6C.

In another example, the authentication password may be a value that the external electronic device 104 automatically generates by an internal algorithm such as an authentication password generation algorithm.

FIG. 6C is a diagram illustrating an example user interface displayed during an operation of registering authentication information of an external electronic device according to various embodiments.

According to various embodiments, referring to FIG. 6C, the external electronic device 104 may display a user interface 710 prompting a user to input an authentication password for device registration and transmit authentication information including an authentication password input through the user interface 710 to the electronic device 101.

According to various embodiments, in operation 703, the electronic device 101 may transmit a result of registering the authentication information to the external electronic device 104. For example, referring to FIG. 6B, in operation 703, the electronic device 101 may transmit a response operation code 0x10, a request operation code 0x01, success 0x01, and an authentication index 0x07 defined in [Table 5] and [Table 6] as the result of registering the authentication information to the external electronic device 104. For example, the authentication index 0x07 may be obtained based on the authentication information by the electronic device 101.

According to various embodiments, in operation 704, the external electronic device 104 may set a function name in the electronic device 101. According to an embodiment, the function name may be the name of an application or service of the external electronic device 104 that has transmitted the authentication information to the electronic device 101 to request data access right. For example, referring to FIG. 6B, in operation 704, the external electronic device 104 may transmit an operation code 0x03 defining set name, the authentication index 0x07, the authentication consent (e.g., the authentication password), and the function name (e.g., a bike application) to the electronic device 101.

According to various embodiments, in operation 705, the electronic device 101 may notify the external electronic device 104 of completion of the function name setting. For example, referring to FIG. 6B, the electronic device 101 may transmit a response operation code 0x10, a request operation code 0x03, and success 0x01 as the result of completing the function name setting to the external electronic device 104 in operation 705.

According to various embodiments, the electronic device 101 may store authentication information for each function received from the external electronic device 104 in the memory (e.g., the memory 130 of FIG. 1). For example, the authentication information for each function stored in the memory may be configured as illustrated, for example, in [Table 13] below. According to various embodiments, the authentication information for each function stored in the memory may include at least one of an external device type (e.g., BLE Address (smart TV)), a function name (e.g., bike application), an authentication index (e.g., 0x07), an authentication password (e.g., 123456), data permission, or status.

TABLE 13

| Device | App Name | Authentication Index | Authentication Consent | Data Permission | Status |
|---|---|---|---|---|---|
| BLE Address (Smart TV) | Bike App | 0 × 07 | 123456 | N/A (before setting) | Not Approved |

Figure 7A:
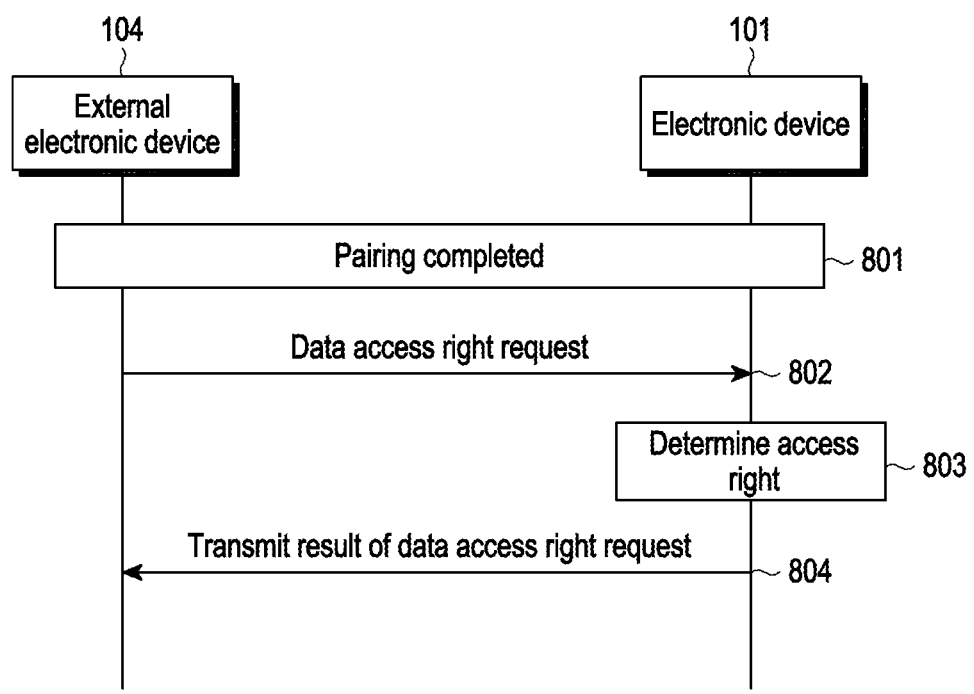
FIGS. 7A and 7B are signal flow diagrams illustrating an example operation of determining whether to allow data access of an external electronic device in an electronic device according to various embodiments.
Figure 7B:
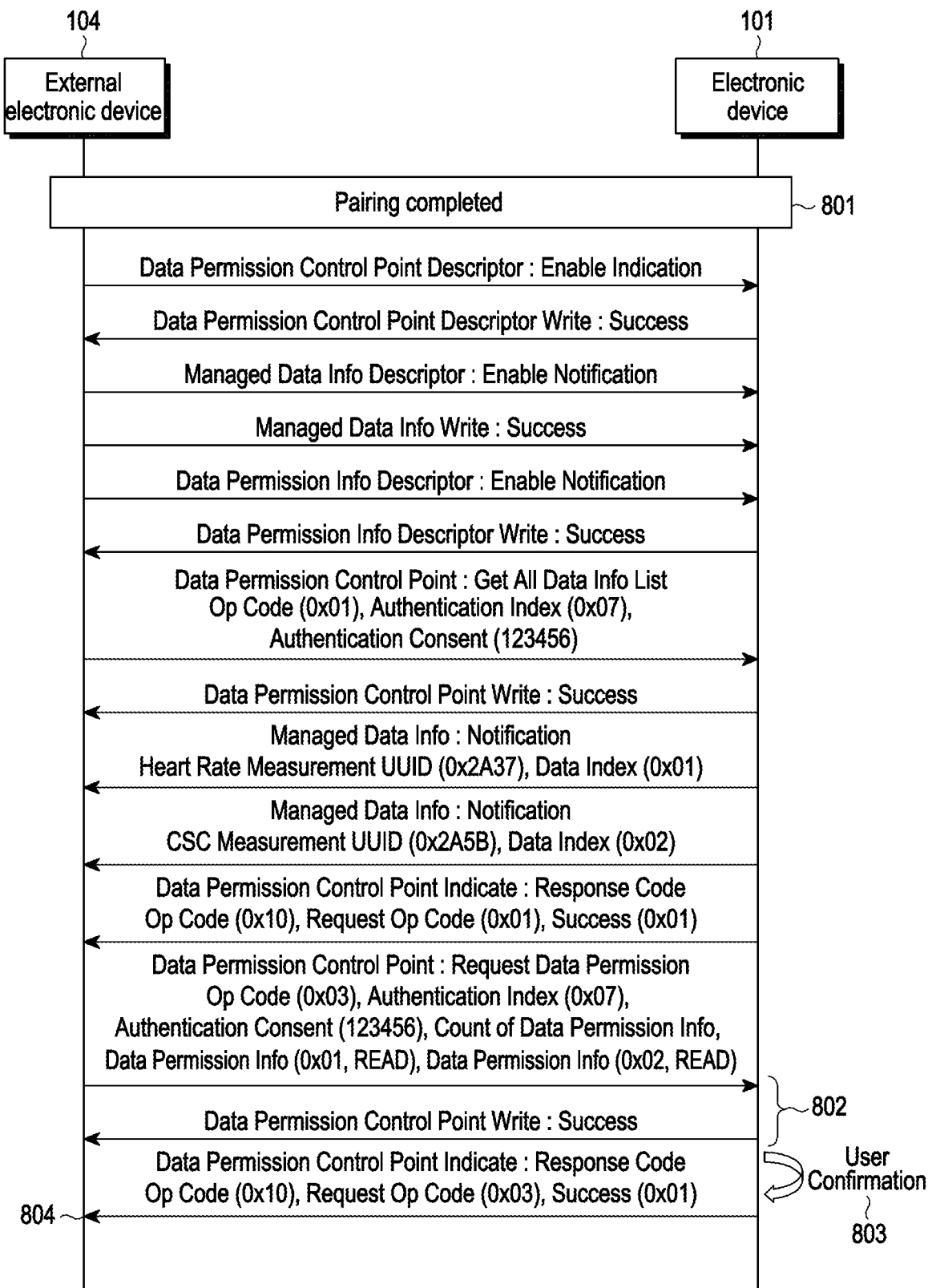

FIGS. 7A and 7B are signal flow diagrams illustrating an example operation of determining whether to allow data access of an external electronic device in an electronic device according to various embodiments.

According to various embodiments, referring to FIG. 7A or 7B, the electronic device 101 (e.g., the electronic device 101 of FIG. 1 or the electronic device 101 of FIG. 2) may complete pairing (e.g., BLE pairing) with the external electronic device 104 (e.g., the electronic device 104 of FIG. 1 or the external electronic device 104-1 or 104-2 of FIG. 2) in operation 801.

Figure 7C:
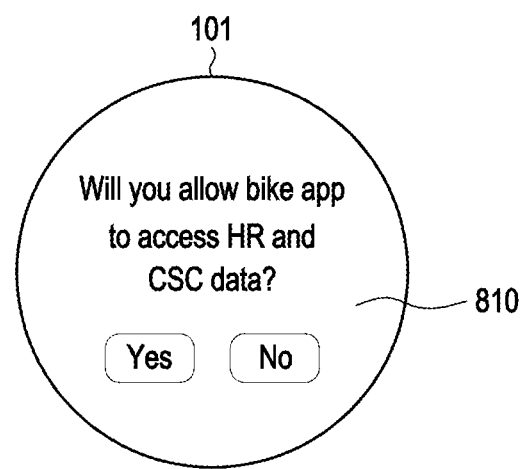
FIG. 7C is a diagram illustrating an example message asking a user whether to accept a data access request from an external electronic device according to various embodiments.

According to various embodiments, in operation 802, the external electronic device 104 may request data access right to the electronic device 101. For example, referring to FIG. 7B, in operation 802, the external electronic device 104 may transmit a data access right request including an operation code 0x03 defining request data permission, an authentication index 0x07, authentication consent (e.g., an authentication password), count of data permission info 0x02, and data permission information 0x01, READ, and data permission information 0x02, READ as defined in Table 8 to the electronic device 101. For example, the count of data permission info may be the number of data for which data access right is requested, and the data permission information may include information about a data access right level (e.g., read right or write right). Referring to FIG. 7C along, the external electronic device 104 may transmit a read right request for two data (e.g., heart rate (HR) data and cycling speed and cadence (CSC) data) to the electronic device 101.

According to various embodiments, the external electronic device 104 may authenticate a data request function based on a pre-registered authentication index and authentication consent (an authentication password), searches for a data list that requires right currently managed by the electronic device 101, and request right to access intended specified data.

According to various embodiments, in operation 803, the electronic device 101 may determine access right for the data access request. For example, the electronic device 101 may identify the data right for the data access request according to a preset rule or through a user confirmation as in operation 803 of FIG. 7B.

According to various embodiments, the electronic device 101 may ask the user whether to accept or reject the access request.

For example, as illustrated in FIG. 7C, the electronic device 101 may display a message 810 asking the user whether to accept the data access request on the display (e.g., the display module 160 of FIG. 1), and identify the access right for the data access request based on a received user acceptance or rejection (e.g., a received user utterance) in response to the message.

In another example, while not shown, when the electronic device 101 supports a voice recognition service, the electronic device 101 may output a voice message asking the user whether to accept the data access request through a sound output module (e.g., the sound output module 155 of FIG. 1) and identify the access right for the data access request based on a user acceptance or rejection (e.g., a user utterance) received in response to the message.

FIG. 7C is a diagram illustrating an example message asking a user whether to accept a data access request from an external electronic device according to various embodiments.

According to various embodiments, referring to FIG. 7C, the electronic device 101 may display a message 810 asking a user whether to allow an application of the external electronic device to access HR data and CSC data. For example, the CSC data may refer, for example, to information about a pure moving speed and the number of revolutions per minute of a bicycle.

According to various embodiments, the electronic device 101 may determine whether to accept the data access request based on a user acceptance or rejection through the message 810. According to various embodiments, in operation 804, the electronic device 101 may transmit a result of the determination made regarding the data access right request to the external electronic device 104. For example, referring to FIG. 7B, in operation 804, the electronic device 101 may transmit a response operation code 0x10, a request operation code 0x03, and success 0x01 as a result of the determination made regarding the data access right request to the electronic device 104.

According to various embodiments, the electronic device 101 may store the results of performing the operations illustrated in FIGS. 7A and 7B in the memory (e.g., the memory 130 of FIG. 1). For example, information indicating whether data access is allowed in response to the data access right request received from the external electronic device 104 may be stored in the memory. For example, the information indicating whether data access is allowed in response to the data access right request, stored in the memory may be configured as illustrated, for example, in [Table 14] below. According to various embodiments, the information indicating whether data access is allowed in response to the data access right request, stored in the memory may include at least one of an external device type (e.g., BLE Address (smart TV), the name of a function (e.g., bike application), an authentication index (e.g., 0x07), an authentication password (e.g., 123456), or data permission. According to various embodiments, the data permission may include information about access right for each data. Referring to [Table 14], information indicating read permission for HR and read permission for CSC data may be included.

TABLE 14

| Device | App Name | Authentication Index | Authentication Consent | Data Permission |
|---|---|---|---|---|
| BLE Address (Smart TV) | Bike App | 0 × 07 | 123456 | HR:READ CSC:READ |

Figure 8A:
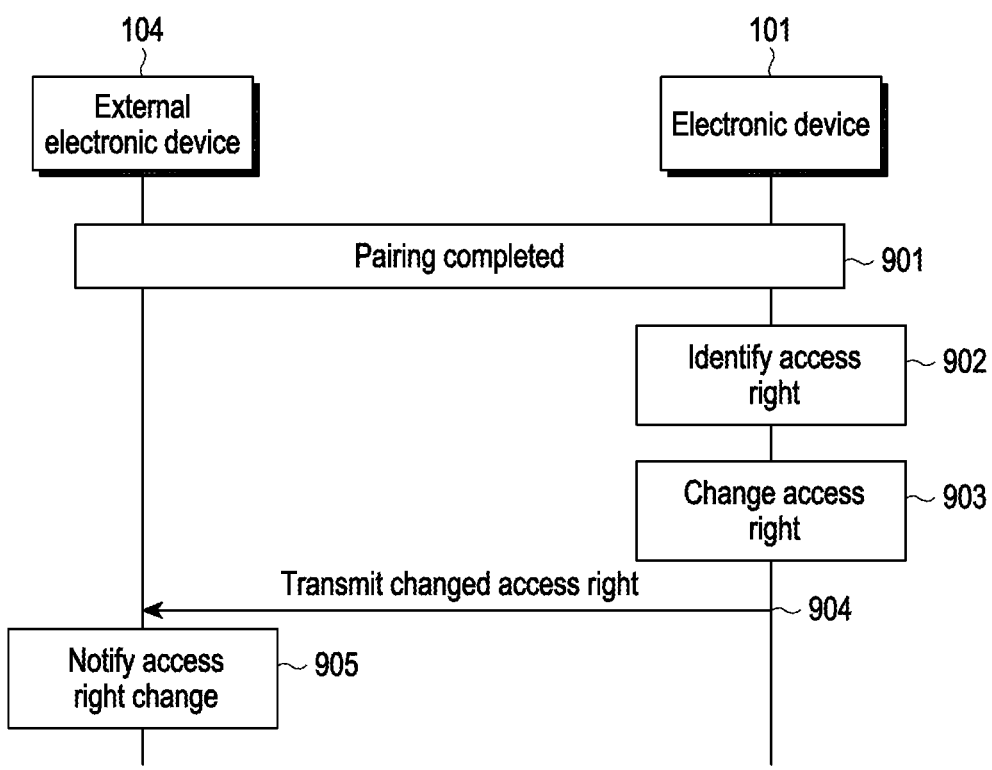
FIGS. 8A and 8B are signal flow diagrams illustrating an example operation of changing the access right of an electronic device according to various embodiments.
Figure 8B:
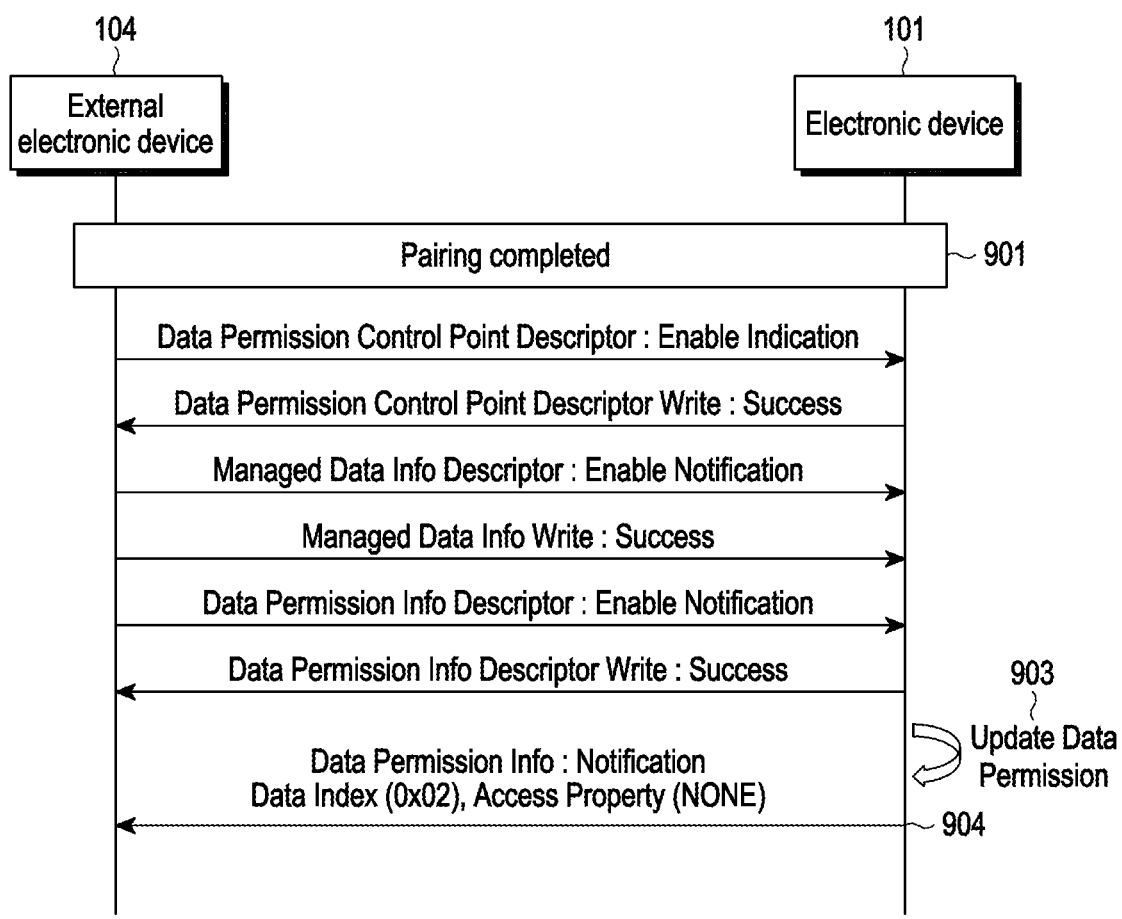

FIGS. 8A and 8B are signal flow diagrams illustrating an example operation of changing data access right in an electronic device according to various embodiments.

FIGS. 8A and 8B are diagrams illustrating an operation of changing the data access right of an external electronic device in an electronic device according to various embodiments.

According to various embodiments, referring to FIG. 8A or 8B, the electronic device 101 (e.g., the electronic device 101 of FIG. 1 or the electronic device 101 of FIG. 2) may complete pairing (e.g., BLE pairing) with the external electronic device 104 (e.g. the electronic device 104 of FIG. 1 or the external electronic device 104-1 or 104-2 of FIG. 2) in operation 901.

According to various embodiments of the present disclosure, in operation 902, the electronic device 101 may identify data access right. For example, upon receipt of a request for identifying the data access right of a first function from the user, the electronic device 101 may provide the data access right of the first function to the user as illustrated in (a) of FIG. 8C.

Figure 8C:
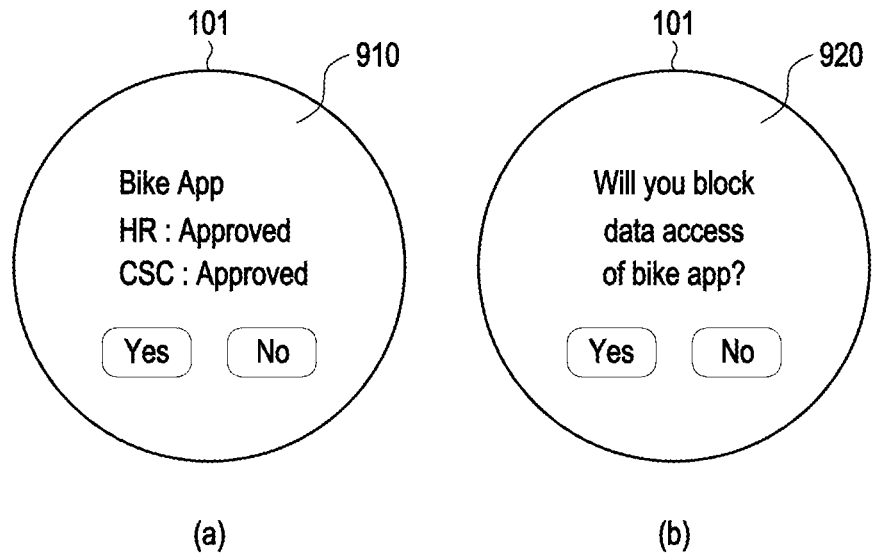
FIG. 8C is a diagram illustrating example user interfaces displayed on an electronic device or an external electronic device, when access right is changed according to various embodiments.
Figure 8C:
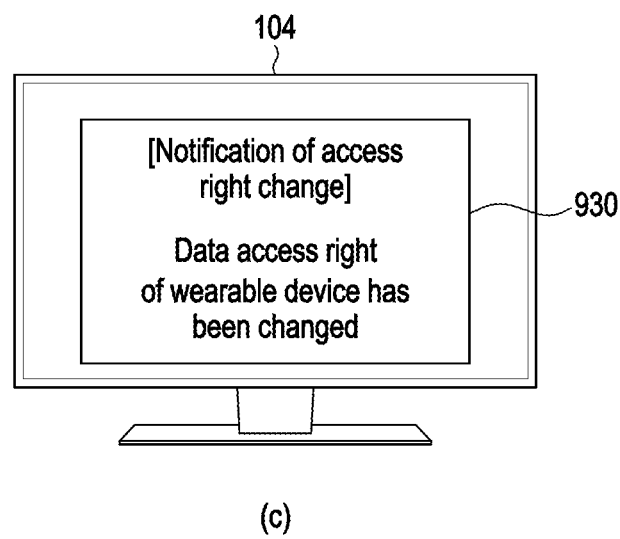

FIG. 8C is a diagram illustrating example user interfaces displayed on an electronic device or an external electronic device, when access right is changed according to various embodiments.

According to various embodiments, referring to (a) of FIG. 8C, the electronic device 101 may display a user interface 910 indicating the data access right of the first function (e.g., a bike application).

According to various embodiments, in operation 903, the electronic device 101 may change the access right. For example, as illustrated in (b) of FIG. 8C, the electronic device 101 may change the data access right of the first function based on a user input received through a user interface 920 for changing the right of the first function to access data (e.g., CSC data).

According to various embodiments, the electronic device 101 may update authentication information for the first function stored in the memory (e.g., the memory 130 of FIG. 1) based on the user input for changing the access right.

According to various embodiments, in operation 904, the electronic device 101 may transmit the changed access right to the external electronic device 104. For example, referring to FIG. 8B, the electronic device 101 may transmit notification information including a data index 0×02 (e.g., CSC measurement) and Access Property (NONE) based on a user input for withdrawing the right to access CSC.

According to various embodiments, when the electronic device 101 and the external electronic device 104 are not in a connected state, the external electronic device 104 may check authentication information about the first function stored in the electronic device 101 in the next connected state.

According to various embodiments, in operation 905, the external electronic device 104 may provide an access right change notification. For example, referring to (c) of FIG. 8C, the external electronic device 104 may display a user interface 930 informing that the access right of the first function has been changed to provide the access right change notification to the user.

While not shown, according to an embodiment, the user interface for inquiring and changing the data access right of the first function and the user interface indicating the change of the access right may be provided through the sound output module (e.g., the sound output module 155 in FIG. 1).

According to various example embodiments, an electronic device (e.g., the electronic device 101 of FIG. 2 or the electronic device 101 of FIG. 2) may include: a communication module (e.g., the communication module 190 of FIG. 1) comprising communication circuitry configured to operate in BLE, a memory (e.g., the memory 130 of FIG. 1), and at least one processor (e.g., the processor 120 of FIG. 1) operatively coupled to the communication module and the memory, and the at least one processor may be configured to: receive authentication information about each function from an external electronic device via BLE, the authentication information about each function including information about data for the function and information about an access right level of the function, store the received authentication information about each function in the memory, and control the communication module to transmit an authentication index of each function corresponding to the authentication information about the function to the external electronic device by BLE.

According to various example embodiments, the at least one processor is configured to: upon receipt of a data access request for a first function from the external electronic device, determine whether to accept the data access request based on an authentication index of the first function included in the data access request, and control the communication module to transmit data for the first function to the external electronic device or block data access from the first function, based on the determination of whether to accept the data access request.

According to various example embodiments, the at least one processor may be configured to: upon receipt of a start command for a data access period from the external electronic device, start the data access period, upon receipt of the data access request within the data access period, determine whether to accept the data access request, and end the data access period after the data transmission or the blocking of data access in response to the data access request.

According to various example embodiments, the at least one processor may be configured to: upon receipt of a data access request for a second function from the external electronic device within the data access period, block data access from the second function based on an authentication index of the second function in response to the data access request for the second function.

According to various example embodiments, the at least one processor may be configured to block data access in response to a data access request received after the end of the data access period.

According to various example embodiments, the electronic device may further include: a display, and the at least one processor may be configured to: control the display to display a message asking whether to accept the data access request based on the authentication index of the first function, and determine whether to accept the data access request based on a received acceptance or rejection in response to the message.

According to various example embodiments, the information about data for each function may include information about a data type used for the function, and the information about the access right level may include information about right to read the data or right to write the data.

According to various example embodiments, the at least one processor may be configured to: upon receipt of an input for changing at least one of data for a first function included in the stored authentication information or an access right level of the first function for the data, update the authentication information based on the input, and control the communication module to transmit a result of the update of the authentication information to the external electronic device.

According to various example embodiments, the electronic device may be a wearable device.

According to various example embodiments, a method of controlling an electronic device may include: receiving authentication information about each function from an external electronic device through a communication module operating in BLE, the authentication information about each function including information about data for the function and information about an access right level of the function, storing the received authentication information about each function in a memory, and transmitting an authentication index of each function corresponding to the authentication information about the function to the external electronic device by BLE.

According to various example embodiments, the method may further include: upon receipt of a data access request for a first function from the external electronic device, determining whether to accept the data access request based on an authentication index of the first function included in the data access request, and transmitting data for the first function to the external electronic device or blocking data access from the first function, based on the determination of whether to accept the data access request.

According to various example embodiments, the determination of whether to accept the data access request may include: upon receipt of a start command for a data access period from the external electronic device, starting the data access period, upon receipt of the data access request within the data access period, determining whether to accept the data access request, and ending the data access period after the data transmission or the blocking of data access in response to the data access request.

According to various example embodiments, the method may further include: upon receipt of a data access request for a second function from the external electronic device within the data access period, blocking data access from the second function based on an authentication index of the second function in response to the data access request for the second function.

According to various example embodiments, the method may further include blocking data access in response to a data access request received after the end of the data access period.

According to various example embodiments, the determination of whether to accept the data access request may include displaying, on a display, a message asking whether to accept the data access request based on the authentication index of the first function, and determining whether to accept the data access request based on a received acceptance or rejection in response to the message.

According to various example embodiments, the information about data for each function may include information about a data type used for the function, and the information about the access right level may include information about right to read the data or right to write the data.

According to various example embodiments, the method may further include, upon receipt of an input for changing at least one of data for a first function included in the stored authentication information or an access right level of the first function for the data, updating the authentication information based on the input, and transmitting a result of the update of the authentication information to the external electronic device.

According to various example embodiments, the electronic device may be a wearable device.

According to various example embodiments, an electronic device (e.g., the electronic device 104 of FIG. 1 or the external electronic device 104-1 or 104-2 of FIG. 2) may include: a communication module comprising communication circuitry configured to operate in BLE, a memory, and at least one processor operatively coupled to the communication module and the memory. The at least one processor may be configured to: control the communication module to transmit authentication information about each function stored in the memory to an external wearable device by BLE, the authentication information about each function including information about data for the function and information about an access right level of the function, control the communication module to receive an authentication index of each function corresponding to the authentication information about the function from the external wearable device by BLE, and store the received authentication index of each function in the memory.

According to various example embodiments, the at least one processor may be configured to control the communication module to: transmit a data access request for a first function to the external wearable device, the data access request including an authentication index of the first function, and receive a result of a determination of whether the data access request for the first function is accepted from the external wearable device.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a communication module comprising communication circuitry configured to operate in Bluetooth low energy (BLE);
    at least one processor; and
    memory storing instructions which, when executed by the at least one processor, cause the electronic device to perform operations comprising:
        receiving from an external electronic device, via BLE, authentication information about each function of one or more functions provided by the external electronic device, the authentication information about each respective function including information about data for the respective function and information about an access right level of the respective function,
        storing the received authentication information about each respective function in the memory, and
        controlling the communication module to transmit to the external electronic device, by BLE, an authentication index for managing a data access right of each respective function and which corresponds to the authentication information about the respective function.

2. The electronic device of claim 1, wherein memory stores instructions for causing the electronic device to perform operations comprising:
    based on receiving of a first data access request for a first function from the external electronic device, determining whether to accept the first data access request based on an authentication index of the first function included in the first data access request, and
    controlling the communication module to transmit data for the first function to the external electronic device or to block data access from the first function, based on the determining of whether to accept the first data access request.

3. The electronic device of claim 2, wherein memory stores instructions for causing the electronic device to perform operations comprising:
    based on receiving of a start command for a data access period from the external electronic device, starting the data access period,
    based on receiving of the first data access request within the data access period, determining whether to accept the first data access request, and
    ending the data access period after the data transmitting or the blocking of data access in response to the first data access request.

4. The electronic device of claim 3, wherein memory stores instructions for causing the electronic device to perform operations comprising, based on receiving of a second data access request for a second function from the external electronic device within the data access period, blocking data access from the second function based on an authentication index of the second function in response to the second data access request.

5. The electronic device of claim 3, wherein memory stores instructions for causing the electronic device to perform operations comprising blocking data access in response to a data access request received after an end of the data access period.

6. The electronic device of claim 2, further comprising a display,
wherein memory stores instructions for causing the electronic device to perform operations comprising:
controlling the display to display a message asking whether to accept the first data access request based on the authentication index of the first function, and
determining whether to accept the first data access request based on a received acceptance or rejection in response to the message.

7. The electronic device of claim 1, wherein the information about data for each respective function includes information about a data type used for the respective function, and
wherein the information about the access right level includes information about a right to read/write data.

8. The electronic device of claim 1, wherein memory stores instructions for causing the electronic device to perform operations comprising:
based on receiving an input for changing at least one of data for a first function included in the stored authentication information or an access right level of the first function for the data, updating the authentication information based on the input, and
controlling the communication module to transmit a result of the updating of the authentication information to the external electronic device.

9. The electronic device of claim 1, wherein the electronic device comprises a wearable device.

10. A method of controlling an electronic device, the method comprising:
receiving from an external electronic device through a communication module, via Bluetooth low energy (BLE), authentication information about each function of one or more functions provided by the external electronic device, the authentication information about each respective function including information about data for the respective function and information about an access right level of the respective function;
storing the received authentication information about each respective function in memory of the electronic device; and
transmitting to the external electronic device, by BLE, an authentication index for managing a data access right of each respective function and which corresponds to the authentication information about the respective function.

11. The method of claim 10, further comprising:
based on receiving a first data access request for a first function from the external electronic device, determining whether to accept the first data access request based on an authentication index of the first function included in the first data access request; and
transmitting data for the first function to the external electronic device or blocking data access from the first function, based on the determining of whether to accept the first data access request.

12. The method of claim 11, wherein the determination of whether to accept the data access request comprises:
based on receiving a start command for a data access period from the external electronic device, starting the data access period,
based on receiving the first data access request within the data access period, determining whether to accept the first data access request, and
ending the data access period after the data transmitting or the blocking of data access in response to the first data access request.

13. The method of claim 12, further comprising:
based on receiving a second data access request for a second function from the external electronic device within the data access period, blocking data access from the second function based on an authentication index of the second function in response to the second data access request.

14. The method of claim 12, further comprising blocking data access in response to a data access request received after an end of the data access period.

15. The method of claim 11, wherein determining whether to accept the first data access request comprises:
displaying, on a display, a message asking whether to accept the first data access request based on the authentication index of the first function, and
determining whether to accept the first data access request based on a received acceptance or rejection in response to the message.

16. The method of claim 10, wherein the information about data for each respective function includes information about a data type used for the respective function, and
wherein the information about the access right level includes information about a right to read/write data.

17. The method of claim 10, further comprising:
based on receiving an input for changing at least one of data for a first function included in the stored authentication information or an access right level of the first function for the data, updating the authentication information based on the input; and
transmitting a result of the updating of the authentication information to the external electronic device.

18. The method of claim 10, wherein the electronic device comprises a wearable device.

19. An electronic device comprising:
a communication module comprising communication circuitry configured to operate in Bluetooth low energy (BLE);
at least one processor; and
memory storing instructions which, when executed by the at least one processor, cause the electronic device to perform operations comprising
controlling the communication module to transmit to an external wearable device, by BLE, authentication information stored in the memory about each function of one or more functions, the authentication information about each respective function including information about data for the respective function and information about an access right level of the respective function,
receiving from the external wearable device, via BLE, an authentication index for managing an access right of each respective function and which corresponds to the authentication information about the respective function, and
storing the received authentication index of each respective function in the memory.

20. The electronic device of claim 19, wherein memory stores instructions for causing the electronic device to perform operations comprising:
- controlling the communication module to transmit a data access request for a first function to the external wearable device, the data access request including an authentication index of the first function, and
- receiving from the external wearable device a result of a determination of whether the data access request for the first function is accepted.

* * * * *